(12) United States Patent
Akiyoshi

(10) Patent No.: US 9,461,893 B2
(45) Date of Patent: Oct. 4, 2016

(54) COMMUNICATION SYSTEM, NODE, STATISTICAL INFORMATION COLLECTION DEVICE, STATISTICAL INFORMATION COLLECTION METHOD AND PROGRAM

(75) Inventor: Ippei Akiyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/811,814

(22) PCT Filed: Jul. 25, 2011

(86) PCT No.: PCT/JP2011/004167
§ 371 (c)(1),
(2), (4) Date: Jan. 23, 2013

(87) PCT Pub. No.: WO2012/011290
PCT Pub. Date: Jan. 26, 2012

(65) Prior Publication Data
US 2013/0121170 A1    May 16, 2013

(30) Foreign Application Priority Data
Jul. 23, 2010  (JP) ................. 2010-165621

(51) Int. Cl.
H04L 12/26    (2006.01)

(52) U.S. Cl.
CPC .......... *H04L 43/022* (2013.01); *H04L 12/2602* (2013.01); *H04L 43/00* (2013.01); *H04L 43/08* (2013.01)

(58) Field of Classification Search
None
See application file for complete search history.

(56) References Cited

U.S. PATENT DOCUMENTS

| 6,934,745 B2 * | 8/2005 | Krautkremer ....... H04L 41/0213 370/235 |
| 2005/0013300 A1 * | 1/2005 | Akahane ............. H04L 12/2602 370/395.3 |

(Continued)

FOREIGN PATENT DOCUMENTS

| CN | 1494333 A | 5/2004 |
| CN | 1578272 A | 2/2005 |
| CN | 1764159 A | 4/2006 |
| CN | 101075911 A | 11/2007 |
| JP | 2008-60763 (A) | 3/2008 |
| WO | WO 2008/095010 (A1) | 8/2008 |

OTHER PUBLICATIONS

Chinese Office Action dated Nov. 15, 2014 with an English Translation thereof.

(Continued)

Primary Examiner — Chi H Pham
Assistant Examiner — Vladislav Agureyev
(74) Attorney, Agent, or Firm — McGinn IP Law Group, PLLC

(57) ABSTRACT

For use in a communication system where communication is carried out by setting a packet handling operation (flow entry) in the nodes by a control device, the present invention provides a configuration in which statistical information may be collected at a desired information granularity level without increasing the control load of the control device. A node of the communication system includes a packet processing unit that processes a received packet according to a packet handling operation defining a matching rule and processing of a packet that matches the matching rule; and a statistical information recording unit that records statistical information on a packet according to a division different from the matching rule, and a statistical information collection device is provided that issues an instruction on a division, according to which the statistical information is to be recorded, to the node and collects the statistical information.

21 Claims, 10 Drawing Sheets

(56) References Cited

U.S. PATENT DOCUMENTS

| | | | | |
|---|---|---|---|---|
| 2005/0094572 A1* | 5/2005 | Mimura | ................ | H04L 1/0026 370/252 |
| 2007/0204060 A1* | 8/2007 | Higuchi | ................ | H04L 43/16 709/234 |
| 2008/0052206 A1* | 2/2008 | Edwards | ................ | G06Q 30/04 705/34 |
| 2009/0265421 A1* | 10/2009 | Rabinovich | ......... | H04L 12/2602 709/203 |
| 2011/0141894 A1* | 6/2011 | Breslin | ................ | H04L 67/327 370/235 |
| 2011/0273988 A1* | 11/2011 | Tourrilhes et al. | ........... | 370/237 |

OTHER PUBLICATIONS

International Search Report (ISR) (PCT Form PCT/ISA/210) dated Aug. 16, 2011, in PCT/JP2011/004167.

Nick McKeown and seven other authors, "OpenFlow: Enabling Innovation in Campus Networks", [online], [Searched on Jul. 6, 2010], Internet <URL: http://www.openflowswitch.org//documents/openflow-wp-latest.pdf>.

"Openflow Switch Specification" Version 1.0.0. (Wire Protocol 0x01) [Searched on Jul. 6, 2010], Internet <URL: http://www.openflowswitch.org/documents/openflow-spec-v1.0.0.pdf>.

Extended European Search Report dated May 9, 2016.

* cited by examiner

Fig. 7

| Wildcards | In Port | Ether SA | Ether DA | Ether type | VLAN ID | VLAN PCP | IP SA | IP DA | IP proto | IP ToS bits | TCP/UDP src port | TCP/UDP dst port | Counters | Actions |

⎧ HEADER FIELDS; MATCHING RULE ⎫

Fig. 8

| Counter | Bits |
|---|---|
| Per Table | |
| Active Entries | 32 |
| Packet Lookups | 64 |
| Packet Matches | 64 |
| Per Flow | |
| Received Packets | 64 |
| Received Bytes | 64 |
| Duration (seconds) | 32 |
| Duration (nanoseconds) | 32 |
| Per Port | |
| Received Packets | 64 |
| Transmitted Packets | 64 |
| Received Bytes | 64 |
| Transmitted Bytes | 64 |
| Receive Drops | 64 |
| Transmit Drops | 64 |
| Receive Errors | 64 |
| Transmit Errors | 64 |
| Receive Frame Alignment Errors | 64 |
| Receive Overrun Errors | 64 |
| Receive CRC Errors | 64 |
| Collisions | 64 |
| Per Queue | |
| Transmit Packets | 64 |
| Transmit Bytes | 64 |
| Transmit Overrun Errors | 64 |

COMMUNICATION SYSTEM, NODE, STATISTICAL INFORMATION COLLECTION DEVICE, STATISTICAL INFORMATION COLLECTION METHOD AND PROGRAM

CROSS-REFERENCE TO RELATED APPLICATIONS

The present invention claims priority from Japanese Patent Application 2010-165621 (filed on Jul. 23, 2010) the content of which is hereby incorporated in its entirety by reference into this specification.

The present invention relates to a communication system, a node, a statistical information collection device, a statistical information collection method, and a computer-readable storage medium storing a program, and more particularly to a communication system that includes nodes each of which processes a received packet according to a packet handling operation that matches the received packet, a node, a statistical information collection device, a statistical information collection method, and a computer-readable storage medium storing program.

TECHNICAL FIELD

Background

Recently, the technology called OpenFlow is proposed (see Patent Literature 1 and Non-Patent Literatures 1 and 2). OpenFlow identifies communications as end-to-end flows and performs path control, failure recovery, load balancing, and optimization on a per-flow basis. An OpenFlow switch, which functions as a forwarding node (hereinafter abbreviated simply to "node"), has a secure channel for communication with an OpenFlow controller that serves as a control device, and operates according to the flow table to which information is added, and whose contents are rewritten, according to an instruction from the OpenFlow controller as necessary. In the flow table, a set of the following three is defined for each flow: a matching rule (Header Fields) against which a packet header is matched, flow statistical information (Counters), and an action (Actions) that defines processing contents (see FIG. 7).

For example, when a packet is received, the OpenFlow switch searches the flow table for an entry that has a matching rule (see Header fields in FIG. 7) that matches the header information of the received packet. If an entry matching the received packet is found as a result of the search, the OpenFlow switch updates the flow statistical information (Counters) and performs the processing contents (packet transmission from a specified port, flooding, discard, etc.), described in the action field of the entry, for the received packet. On the other hand, if an entry matching the received packet is not found as a result of the search, the OpenFlow switch forwards the received packet to the OpenFlow controller via the secure channel, requests the OpenFlow controller to determine a packet path based on the transmission source/destination of the received packet, receives a flow entry for the packet path, and updates the flow table. In this way, the OpenFlow switch forwards a packet using an entry, stored in the flow table, as the packet handling operation.

In addition, the OpenFlow controller has the function to collect the flow statistical information (Counters) updated each time a packet is processed as described above (visualization function). FIG. 8 is a diagram showing a list of flow statistical information (Counters) stored in the OpenFlow switch described in Non-Patent Literature 2(see "3.2 Counters" in Non-Patent Literature 2).

Patent Literature 1

International Publication WO2008/095010
NPL 1: Nick McKeown and seven other authors, "OpenFlow: Enabling Innovation in Campus Networks", [online], [Searched on Jul. 6, 2010]
NPL 2: "Openflow Switch Specification" Version 1.0.0. (Wire Protocol OxOl) [Searched on Jul. 6, 2010]

SUMMARY

Technical Problem

The disclosures of Patent Literature and Non-Patent Literatures given above are hereby incorporated by reference into this specification. The following analysis is given by the present invention.

First, with reference to FIG. 9, the following describes the flow in which flow statistical information is collected by the OpenFlow controller described in Patent Literature 1 and Non-Patent Literatures 1 and 2 given above. When an external node 310 transmits a first data packet to an external node 320, this packet arrives first at a node 210 to which the external node is connected (step S901).

When the packet is received, the node 210 searches the flow table for an entry having a matching rule (matching key) that matches the header information of the packet. However, since this packet is the first packet, there is no matching entry. So, the node 210 buffers the received packet and then transmits a new flow detection notification message (Packet-In message) to a control device (controller) 100 (step S902). This Packet-In message includes the information necessary for identifying the flow (for example, MAC (Media Access Control) address, IP (Internet Protocol) address, and port number (those of both transmission source and transmission destination)) as well as the packet receiving port information. Although it is assumed in the above description that the node 210 buffers the received packet and transmits the information, necessary for identifying the flow, to the control device (controller) 100, the node 210 may also transmit the received packet itself to the control device (controller) 100.

When the Packet-In message is received, the control device (controller) 100 creates the matching rule (matching key: see fields "InPort" to "TCP/UDP src port" in FIG. 7) of the new entry based on the received information, determines a timer value to be applied to the entry, confirms the position of the external node 320 that is the destination, and calculates the packet forwarding path from the external node 310 to the external node 320. In the description below, it is assumed that the path, via which the packet is forwarded from the node 210 to a node 220 and then to a node 230, is calculated as a result of the path calculation.

Next, the control device (controller) 100 creates an entry for each of the nodes 210-230, wherein the created entry includes an action for forwarding a packet, which matches the matching rule (matching key) of this new entry, along the forwarding path as well as a timer value, and sets the created entry in each of the nodes 210-230 using the FlowMod message (step S903).

After the entries are set in the nodes 210-230, the node 210 forwards the buffered packet to the node 220 according to the entry that has been set (step S904-1). Because the entries are already set in the nodes 220 and 230 on the forwarding path of this packet, this packet is forwarded to the node 220 and then to the node 230 and arrives at the external node 320 (step S904-2, step S904-3).

After that, a packet transmitted from the external node 310 to the external node 320 is forwarded via the node 210, node 220, and node 230 in this order (step S905-1 to S905-4) and, for each forwarding, the flow statistical information (number of received packets, number of received data bytes, etc., for each entry) is updated in each node.

When the control device (controller) 100 transmits the Stats-Req message, which specifies a particular entry, to an arbitrary node (for example, node 230) at an arbitrary point of time, for example, at a fixed interval, to confirm the communication amount, the node 230 uses the Stats-Rsp message to transmit the flow statistical information, related to the corresponding entry, to the control device (controller) 100.

Now, consider the case in which the external node 310 transmits a data packet of another communication to the external node 320. Because this data packet is transmitted via the communication different from the first communication described above, the source/destination MAC address and the source/destination IP address have the same configurations as the configurations used in the first communication but the source/destination port numbers are different from the source/destination port numbers used in the first communication.

In this case, too, the Packet-In message is transmitted, the flow entry is set in each node, and the packet is forwarded (steps S911 to S915-4) according to the same procedure as that in steps S901-S905-4 described above.

At this time, when the control device (controller) 100 transmits the Stats-Req message, which specifies a particular entry, to an arbitrary node (for example, node 230) to confirm the communication amount, the node 230 uses the Stats-Rsp message to transmit the flow statistical information, related to the entry, to the control device (controller) 100.

According to the method described in Non-Patent Literature 2, entries having different port numbers or VLAN IDs may be individually created and set to allow the flow statistical information on two communications to be collected for use in network load management or accounting processing as described above even in the communication between the same pair of external nodes. However, the problem is that this method leads to an increase in the control load of the control device (controller) 100.

On the other hand a wild card may be specified for a part (for example, the port number in the above example) of the matching rule (matching key) as described in Non-Patent Literatures 1 and 2 to forward the packets of two communications using the same entry as shown in FIG. 10 and thereby to decrease the control load of the control device (controller) 100. However, the problem in this case is that the flow statistical information is collected on an entry basis, not on individual communication basis.

It is an object thereof to provide a configuration for use in a communication system where a control device, such as the OpenFlow controller described in Non-Patent Literatures 1 and 2, sets a packet handling operation (flow entry) in each node for carrying out communication wherein statistical information, which is not constrained by the packet handling operation (flow entry) and is recorded at any information granularity level, may be obtained with no increase in the control load of the control device. In the description below, statistical information recorded and managed in the counter in a flow entry is called "flow statistical information" while statistical information, collected according to the present invention and recorded on a division basis (information granularity) different from that of the flow statistical information, is called "statistical information".

According to a first aspect, there is provided a communication system comprising a node comprising a packet processing unit that processes a received packet according to a packet handling operation, the packet handling operation defining a matching rule and processing of a packet that matches the matching rule; and a statistical information recording unit that records statistical information on a packet according to a division different from the matching rule; and a statistical information collection device that issues an instruction on a division, according to which the statistical information is to be recorded, to the node and collects the statistical information.

According to a second aspect, there is provided a node comprising a packet processing unit that processes a received packet according to a packet handling operation, the single packet handling operation defining a matching rule and processing of a packet that matches the matching rule; and a statistical information recording unit that records statistical information on a packet according to a division different from the matching rule.

According to a third aspect, there is provided a statistical information collection device that issues an instruction on a division, different from the matching rule, to the node described above as a statistical information recording division and collects the statistical information.

According to a fourth aspect, there is provided a statistical information collection method comprising the steps of issuing, by a statistical information collection device, an instruction on a division, different from a matching rule, to a node as a statistical information recording division, the statistical information collection device connected to the node comprising a packet processing unit that processes a received packet according to a packet handling operation, the packet handling operation defining the matching rule and processing of a packet that matches the matching rule; recording, by the node, statistical information on a packet according to the instructed division; and collecting, by the statistical information collection device, the statistical information. This method is associated with a particular machine that is a node for recording statistical information on a packet according to the instruction from the statistical information collection device.

According to a fifth aspect, there is provided a computer-readable storage medium storing a program that causes a computer to perform processing, the computer configuring a node comprising a packet processing unit that processes a received packet according to a packet handling operation, the packet handling operation defining a matching rule and processing of a packet that matches the matching rule wherein the program causes the computer to perfoi in processing of recording statistical information on a packet according to a division, different from the matching rule, according to an instruction from a predetermined statistical information collection device. This program may be recorded on a computer-readable storage medium. That is, the present invention may be embodied as a computer program product.

The meritorious effects of the present invention are summarized as follows.

For use in a communication system where communication is carried out by setting a packet handling operation (flow entry) in the nodes by a control device, statistical information may be collected at a desired information granularity level without increasing the control load of the control device.

BRIEF DESCRIPTION OF DRAWINGS

FIG. 7 is a diagram showing the configuration of a flow entry described in Non-Patent Literature 2.

FIG. 8 is a diagram showing a list of flow statistical information items described in Non-Patent Literature 2.

PREFERRED MODES

Figure 1:
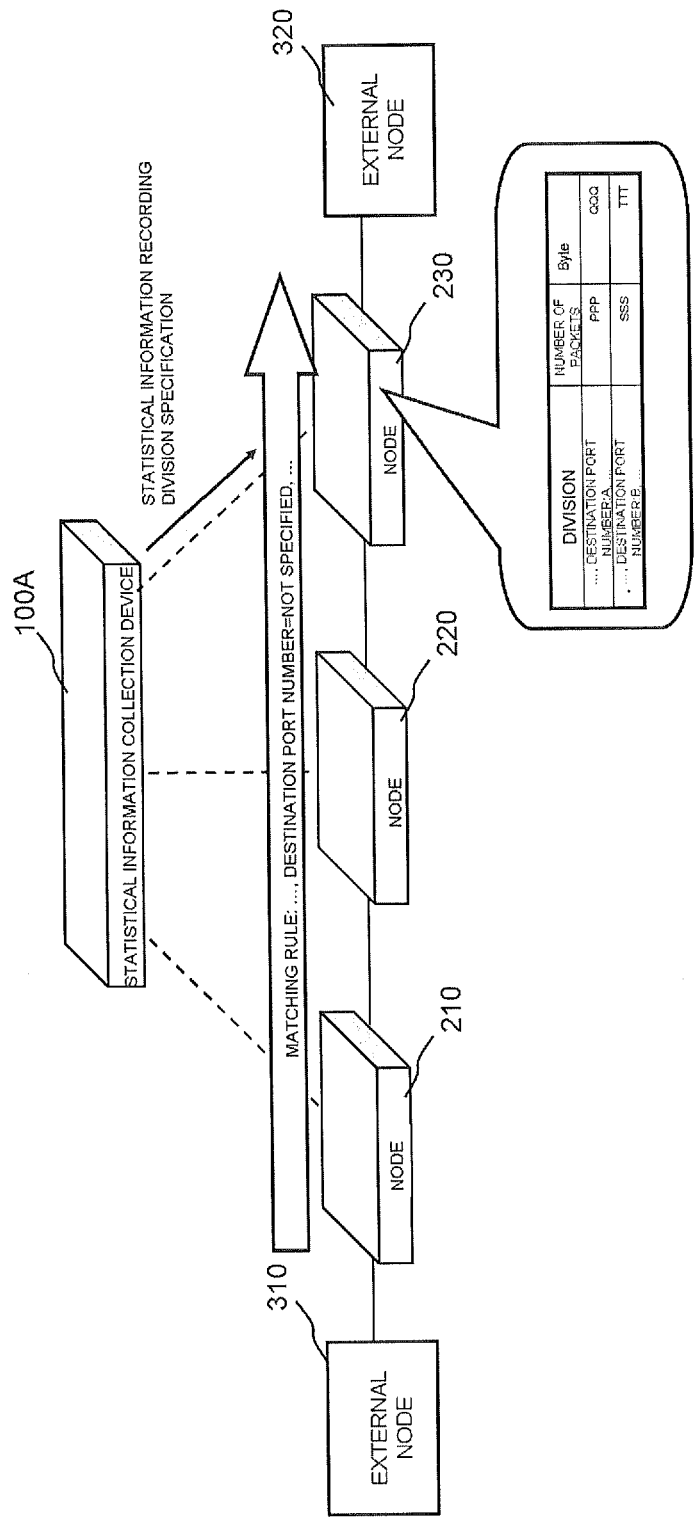
FIG. 1 is a diagram showing the overview of the present invention.

First, the following describes the overview of the disclosure. As shown in FIG. 1, a communication system of an exemplary embodiment of the present disclosure comprises nodes 210-230 each of which comprises a packet processing unit that processes a received packet according to a packet handling operation, the packet handling operation defining a matching rule and processing of a packet that matches the matching rule; and a statistical information recording unit that records statistical information on a packet according to a division different from the matching rule; and a statistical information collection device 100A that issues an instruction on a division, according to which the statistical information is to be recorded, to the node and collects the statistical information. Although the reference numerals of the figures are added to the elements for convenience sake to help understanding the description, the present invention is not limited to the mode shown in the figures.

In addition to the update of flow statistical information described in Non-Patent Literature 2, the nodes 210-230 record statistical information on packets according to a division different from the matching rule. The statistical information collection device 100A collects statistical information on the packets from the nodes 210-230.

Figure 9:
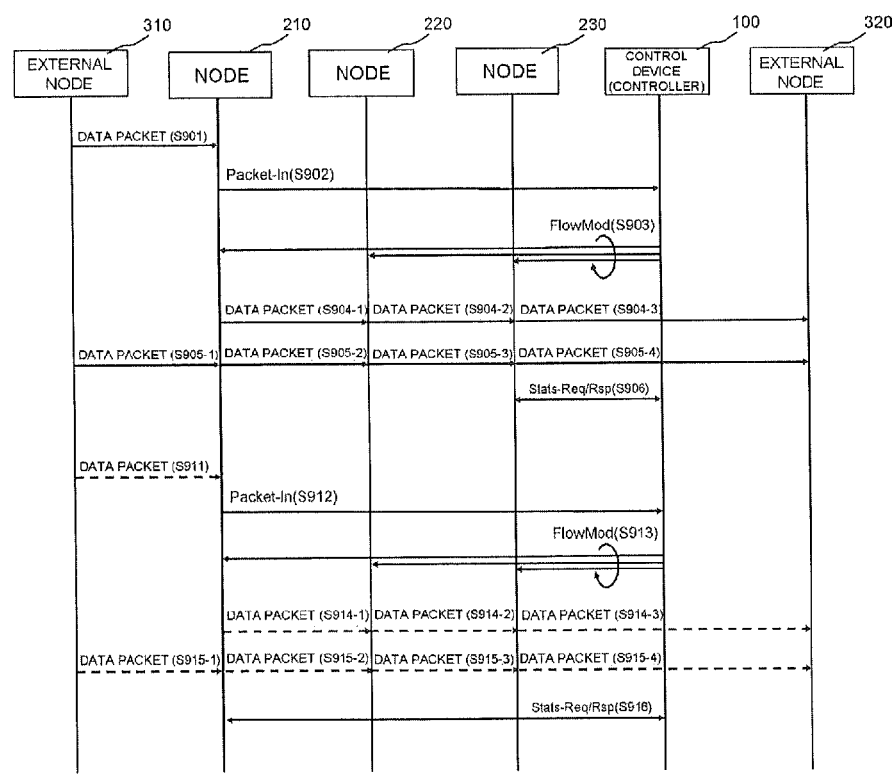
FIG. 9 is a sequence diagram showing an example of the flow statistical information collection operation.
Figure 10:
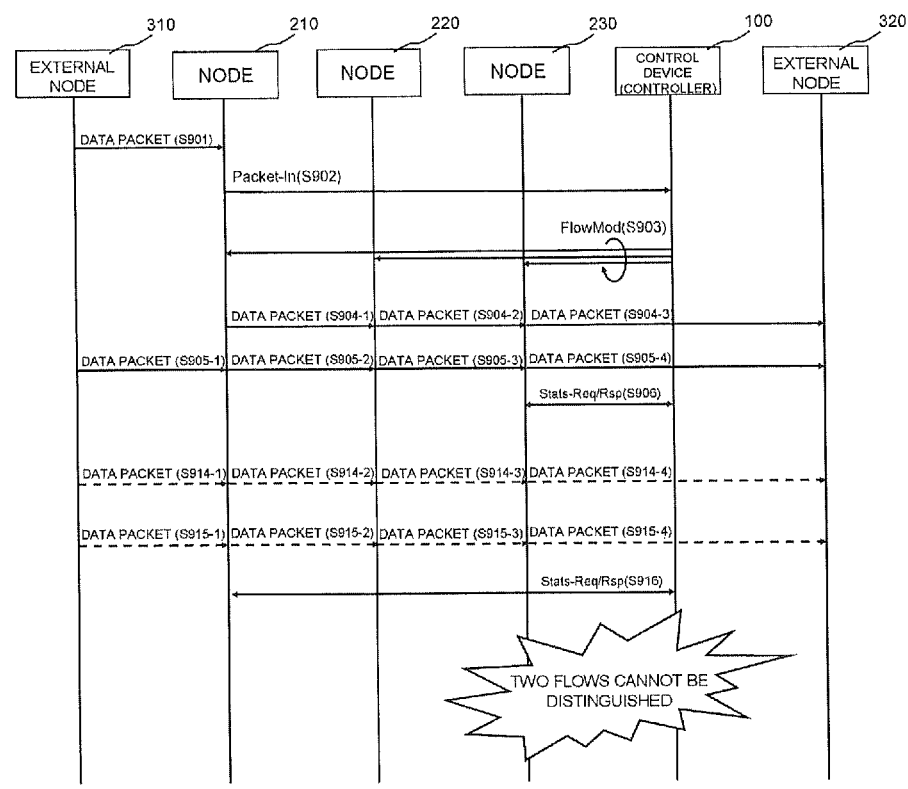
FIG. 10 is a sequence diagram showing another example of the flow statistical information collection operation.

For example, in a system where packets are forwarded according to a matching rule in which a destination port number is not specified as shown in the arrow in the center of FIG. 1 (this forwarding manner is similar to that in FIG. 10), the present invention causes the nodes 210-230 to record more detailed statistical information subdivided according to a destination port number, allowing statistical information to be collected at an information granularity level equivalent to that of the flow statistical information shown in the sequence diagram in FIG. 9 described above. Although statistical information is collected according to the destination port number in the example shown in FIG. 1, not only the header field items shown in FIG. 7 but also the header information in a higher-level layer may be used to record statistical information.

The statistical information collected in this way may be used for traffic monitoring/management or accounting processing by communication type. Note that the statistical information collection device 100A may be configured by adding the statistical information recording division instruction function and the statistical information collection function to the OpenFlow controller described in Non-Patent Literatures 1 and 2 or by an information processing device other than the OpenFlow controller described in Non-Patent Literatures 1 and 2.

First Exemplary Embodiment

Figure 2:
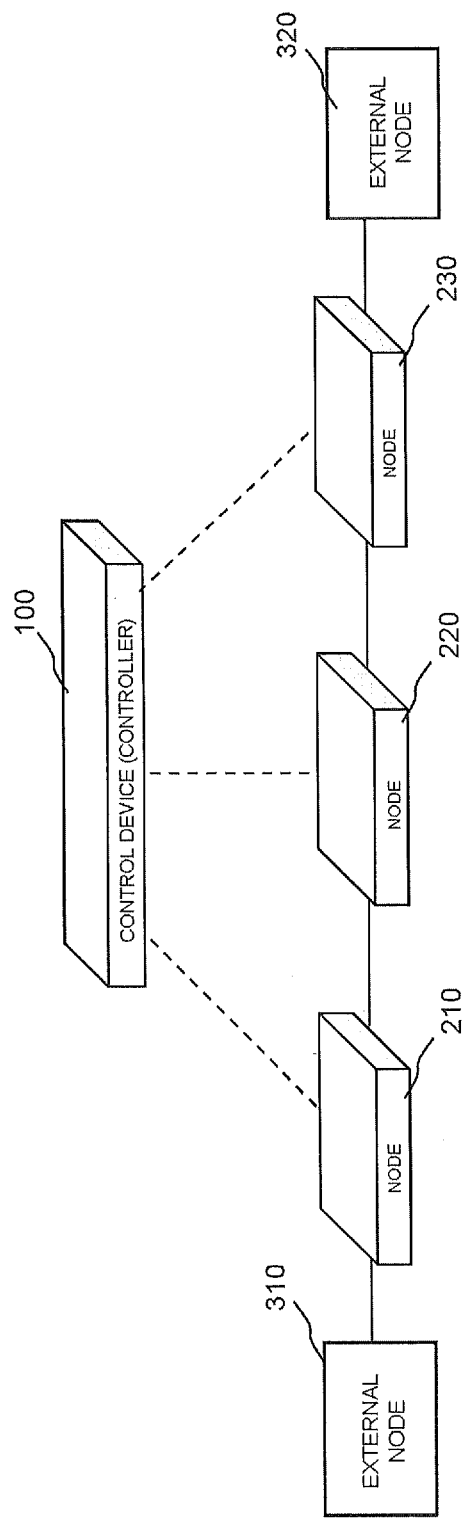
FIG. 2 is a diagram showing the configuration of a first embodiment of the present invention.

Next, a first exemplary embodiment of the present invention will be described more in detail below with reference to the drawings. FIG. 2 is a diagram showing the configuration of the first exemplary embodiment of the present invention. FIG. 2 shows multiple nodes 210-230, a control device (controller) 100 that sets a packet handling operation (flow entry) in the multiple nodes to control the nodes, and external nodes 310 and 320 that communicate with each other via a network composed of the multiple nodes 210-230.

Figure 3:
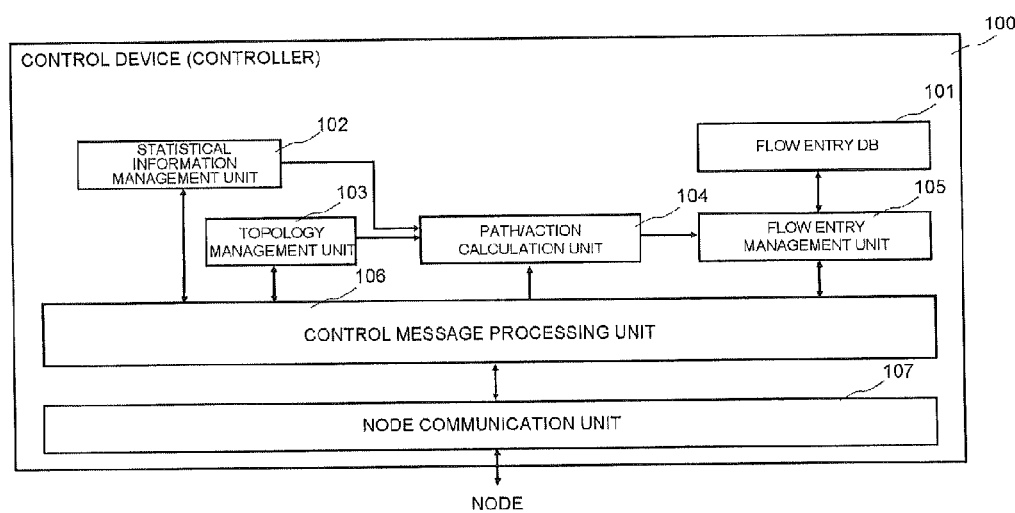
FIG. 3 is a block diagram showing the configuration of a control device (controller) in the first embodiment of the present invention.

FIG. 3 is a diagram showing the detailed configuration of the control device (controller) 100 shown in FIG. 2. Referring to FIG. 3, the control device (controller) 100 comprises a flow entry database (flow entry DB) 101 in which processing rules packet handling operations (flow entries) exemplified in FIG. 7 and each composed of a matching rule (matching key), an action (including a timer value), and flow statistical information are stored, an statistical information management unit 102, a topology management unit 103, a path/action calculation unit 104, a flow entry management unit 105, a control message processing unit 106, and a node communication unit 107 that communicates with the nodes 210-230. Each of the units operates as follows.

The statistical information management unit 102 issues an instruction on a packet statistical information recording division to an arbitrary node and collects and manages the statistical information from the node. As a method to specify a recording division of the packet statistical information, is one method may be mentioned that additionally specifies a wildcard-specified field which is one of the fields of the matching rule (matching key) of the packet handling operation (flow entry). This method allows distinctive statistical information to be collected for the packets to which the same packet handling operation is applied but which include in this field a value different from that of other packets.

In addition, the statistical information management unit 102 may use the Stats-Req/Stats-Rsp message described above or an equivalent message to collect statistical information via the control message processing unit 106 and the node communication unit 107.

The topology management unit 103 builds and manages network topology information based on the connection relation among the nodes 210-230 collected via the node communication unit 107.

The path/action calculation unit 104 determines a packet forwarding path, an action to be executed by the nodes 210-230 on the forwarding path, and a timer value that is the expiration period of the packet handling operation, based on the statistical information collected and managed by the statistical information management unit 102 and the network topology information built by the topology management unit 103.

The flow entry management unit 105 creates a matching rule (matching key) based on the information received from a node, registers the result calculated by the path/action calculation unit 104 into the flow entry DB 101 as a packet handling operation (flow entry), and sets the packet handling operation (flow entry) in response to a request to add or update the packet handling operation (flow entry) from the nodes 210-230.

The control message processing unit 106 analyzes a control message received from the nodes 210-230 and passes the control message information to the corresponding processing means in the control device (controller) 100. For example, when a new flow detection notification message (Packet-In) is received from the nodes 210-230, the control message processing unit 106 requests the flow entry management unit 105 to check if the packet handling operation (flow entry) to be applied to the new flow is registered in the flow entry DB 101 and, if not, requests the path/action calculation unit 104 to create a new packet handling operation (flow entry).

The control device (controller) 100 such as the one described above may be implemented by adding at least the statistical information management unit 102 to the Open-Flow controller described in Non-Patent Literatures 1 and 2.

Figure 4:
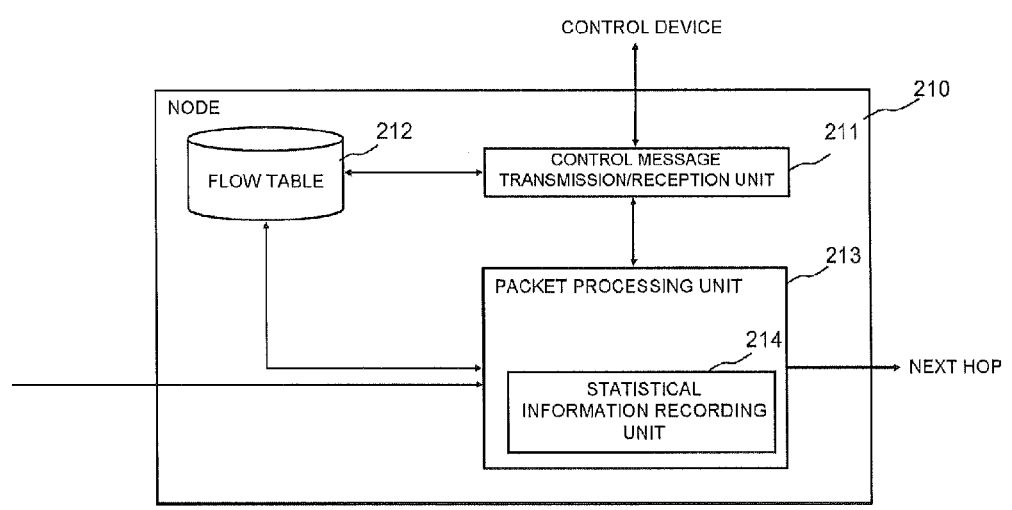
FIG. 4 is a block diagram showing the configuration of a node in the first embodiment of the present invention.

FIG. 4 is a diagram showing the detailed configuration of the node 210 (the configuration of the nodes 220-230 is the same as the configuration of the node 210 and so its description is omitted). Referring to FIG. 4, the node 210 comprises a control message transmission/reception unit 211 that communicates with the control device (controller) 100, a flow table 212, and a packet processing unit 213. A packet buffer, though provided in the packet processing unit 213 in this exemplary embodiment as described in the description below, may be omitted.

The packet processing unit 213 searches the flow table 212 for a packet handling operation (flow entry) having a matching rule (matching key) that matches the received packet and executes the processing contents (for example, forwarding to a particular port, flooding, discard, etc.) described in the action field of the packet handling operation (flow entry). The packet processing unit 213 includes a statistical information recording unit 214 that updates the flow statistical information (see Counters in FIG. 7) contained in the packet handling operation each time the processing contents are executed and records the packet statistical information according to the division instructed by the statistical information management unit 102 of the control device (controller) 100.

In addition, each time the processing contents are executed, the packet processing unit 213 resets the timer value in the action field of the packet handling operation (flow entry) to the initial value (see the description of the timeout value in Non-Patent Literature 2). The timer value is counted down and, when the timer value reaches 0, the packet processing unit 213 deletes the corresponding packet handling operation.

The node 210 such as the one described above may be implemented by adding the above-described statistical information recording unit 214 to the OpenFlow switch described in Non-Patent Literatures 1 and 2. In addition, the statistical information recording unit 214 included in the packet processing unit 213 of the node 210, such as the one described above, may be implemented by a program executed by the computer that configures the node 210.

Figure 5:
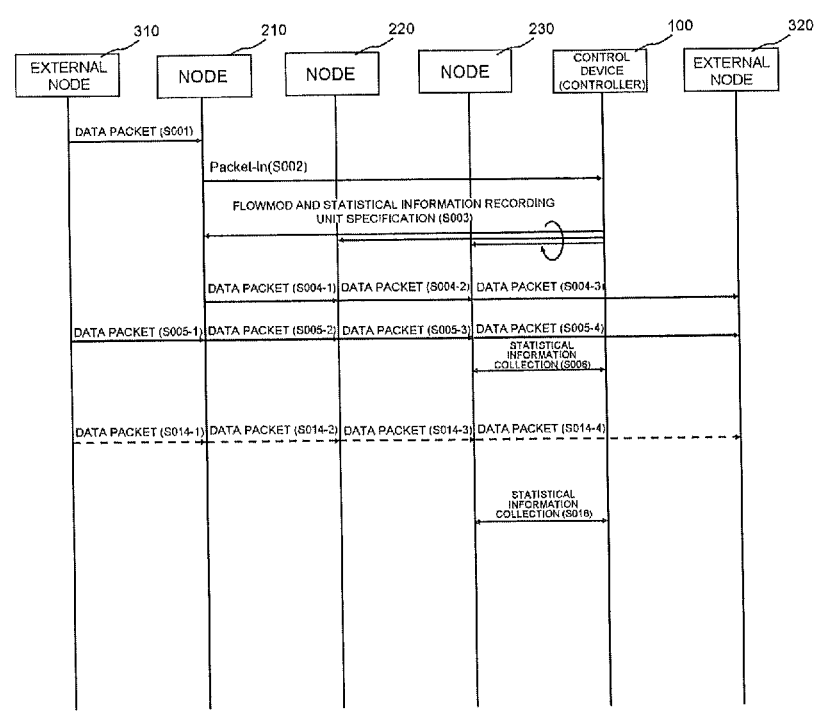
FIG. 5 is a sequence diagram showing the operation of the first embodiment of the present invention.

Next, the following describes the operation of this exemplary embodiment in detail with reference to the drawings. FIG. 5 is a sequence diagram showing the operation of the first exemplary embodiment of the present invention. The arrow (solid line) and the arrow (dotted line) in FIG. 5, which represent data packets, indicate different communications; for example, the application programs operating in the external nodes are different between the communications.

Referring to FIG. 5, the external node 310 first transmits a data packet to the external node 320. This packet arrives at the node 210 to which the external node 310 is connected (step S001).

When the data packet is received, the node 210 searches the flow table 212 for a packet handling operation (flow entry) that matches the received packet. However, since this packet is the first data packet transmitted from the external node 310 to the external node 320, there is no corresponding packet handling operation (flow entry). Therefore, the node 210 buffers the received packet and transmits the new flow detection notification message (Packet-In) to the control device (controller) 100 (step S002).

Assume that this Packet-In message includes the information necessary for creating the matching rule (matching key) of a new packet handling operation (flow entry) (for example, MAC address, IP address, and port number (those of both transmission source and transmission destination)) as well as the packet receiving port information. Although it is assumed in the this exemplary embodiment that the node 210 buffers the received packet and transmits only the information, necessary for creating the matching rule (matching key), to the control device (controller) 100, the node 210 may also transmit the received packet itself to the control device (controller) 100.

When the Packet-In message is received, the control device (controller) 100 determines the matching rule (matching key) of the packet handling operation (flow entry) and the timer value and calculates the forwarding path of the data packet to be transmitted from the external node 310 to the external node 320. In the description below, it is assumed that the path, via which the packet is forwarded from the node 210 to the node 220 and then to the node 230 as shown in FIG. 2, as well as the action for forwarding the packet along this path, is calculated as the result of the path calculation.

In the description below, it is assumed that the control device (controller) 100 has created a matching rule (matching key) that matches any value of the destination/source port number (wildcard is used) if the destination/source MAC address, destination/source IP address, and receiving port information match those of a data packet.

The control device (controller) 100 uses the matching rule (matching key), action, and timer value to create the packet handling operation (flow entry) of the nodes 210-230 on the calculated path and sets the created packet handling operation (flow entry) in the nodes (step S003). At this time, to monitor the communication status more in detail, the control device (controller) 100 sets the processing rule packet handling operation (flow entry) in an arbitrary node on the path (node 230 in this example) and notifies the node about a statistical information recording division by specifying a field of the matching rule (matching key) not used for matching or an arbitrary field in a higher-level layer.

In the description below, assume that the contents of the instruction on the statistical information recording division are that, if a data packet having a different destination port number and/or source port number is transmitted or received, the statistical information is to be recorded distinctively assuming that the transmission or reception is a different communication.

After the packet handling operation (flow entry) has been set in the nodes 210-230, the node 210 forwards the buffered packet according to the packet handling operation (flow entry) that is newly set. Because the packet handling operation (flow entry) has already been set in the nodes 220 and 230 on the forwarding path of this packet, the packet is forwarded to the node 220 and then to node 230 and arrives at the external node 320 (steps S004-1 to S004-3). When the packet is forwarded, the node 210 and the node 220 update the flow statistical information (Counters) of the packet handling operation (flow entry). On the other hand, the node 230 that received the instruction on the statistical information recording division records the statistical information subdivided according to the instructed recording division.

After that, each time a data packet is forwarded between the external nodes 310 and 320, the nodes 210-230 update the flow statistical information or the statistical information (S005-1 to S005-4).

To confirm the detailed communication amount, the control device (controller) 100 transmits a statistical information collection message, which specifies the packet handling operation (flow entry), to the node 230 at a predetermined time interval and receives the statistical information, recorded according to the corresponding packet handling operation (flow entry) and the instructed recording division, from the corresponding node 230 (step S006). At this point of time, the statistical information on one type of communication (for example, destination port number=A) is transmitted to the control device (controller) 100.

Next, the external node 310 transmits a data packet of another communication to the external node 320 (step S014-1). Because this communication is different from the previous communication in which the packet handling operation (flow entry) described above was set, it is assumed that this data packet has the same destination/source MAC address and the same destination/source IP address as those of a data packet of the previous communication but has a destination port number and/or source port number different from that of a data packet of the previous communication.

The packet handling operation (flow entry) that matches this data packet is already registered in the flow table 212 of the nodes 210-230 and, therefore, the nodes 210-230 forward the packet to the next hop according to the respective the packet handling operation (flow entry) (step S014-2 to S014-4). In this case, too, the node 210 and node 220 update the flow statistical information (Counters) of the packet handling operation (flow entry) when forwarding the packet, whereas the node 230, to which the instruction on the statistical information recording division was issued, identifies that the communication is a different communication based on the statistical information recording division (for example, destination port number=B) and records the statistical information accordingly.

After that, when the control device (controller) 100 transmits a statistical information collection message, which specifies the packet handling operation (flow entry), to the node 230 to confirm the detained communication amount, the node 230 transmits the statistical information recorded according to the packet handling operation (flow entry) and the instructed recording division (step S016). At this point of time, the statistical information recorded respectively for the two types of communication (for example, destination port number=A, destination port number=B) is transmitted to the control device (controller) 100.

As described above, this exemplary embodiment allows statistical information on any location to be collected at any granularity level without having to increase the number of packet handling operation (flow entries) that are set in the nodes 210-230, that is, the number of packet handling operation (flow entries) managed by the control device (controller) 100. For example, the flow statistical information at about the same granularity level as that described in Non-Patent Literatures 1 and 2 may be collected by setting a statistical information collection policy for each packet handling operation (flow entry) while, on the other hand, more detailed statistical information may be collected for another packet handling operation (flow entry). Furthermore, path recalculation or packet handling operation (flow entry) aggregation based on the statistical information collected for each flow will help to offer more flexible communication services.

This exemplary embodiment decreases the number of packet handling operation (flow entries) that are set in the nodes 210-230 and, therefore, reduces the size of the storage area of the packet handling operation (flow entry) of the nodes 210-230 and the processing time required for the search processing, thus preventing the packet forwarding ability from being degraded.

In addition, this exemplary embodiment decreases the number of packet handling operation (flow entries) that are set in the nodes 210-230 and, therefore, reduces the management load that may be involved in rewriting the packet handling operation (flow entry), for example, when the network topology is changed due to a network failure or network maintenance.

Although the two communications, in which the destination port number and/or source port number is different between the two, are assumed to be different communications and the statistical information is collected in the above description, some other fields (for example, the VLAN ID field or an arbitrary field in a higher-level layer) may also be specified as a field for the statistical information recording division. Furthermore, though the instruction on the statistical information recording division is issued only to the node 230 on the path in the above description, the same or different statistical information recording division may also be specified for another node to collect the recording result.

Second Exemplary Embodiment

Next, a second exemplary embodiment of the present invention will be described in which some functions are added to the nodes 210-230 in the first exemplary embodiment described above. The configuration of this exemplary embodiment is similar to that of the first exemplary embodiment described above except that the function to notify a control device (controller) 100 about the start or end of statistical information recording is added to a packet processing unit 213 of the nodes 210-230. The following describes the exemplary embodiment with focus on the difference in the operation.

Figure 6:
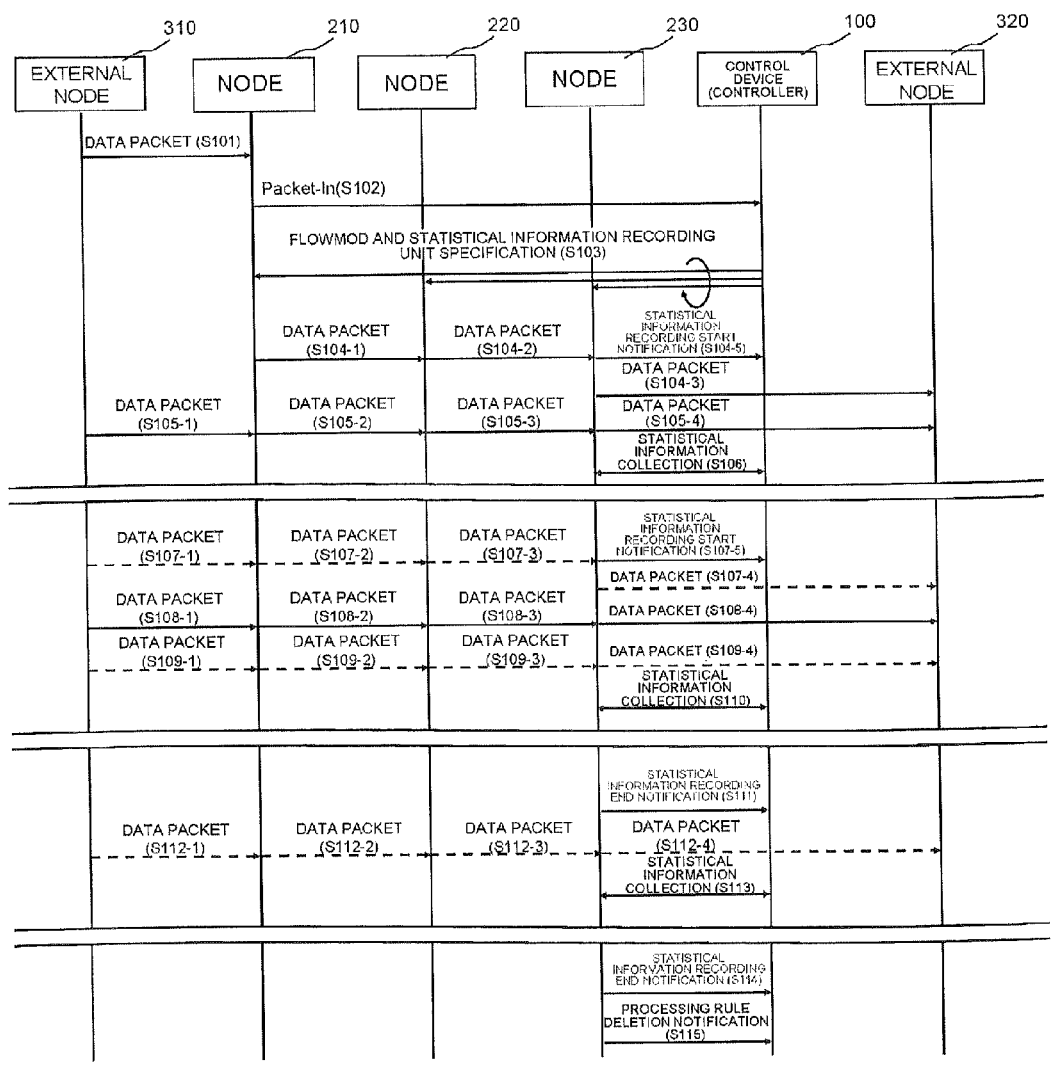
FIG. 6 is a sequence diagram showing the operation of a second embodiment of the present invention.

Next, the following describes the operation of this exemplary embodiment in detail with reference to the drawings. FIG. 6 is a sequence diagram showing the operation of the second exemplary embodiment of the present invention. The arrow (solid line) and the arrow (dotted line) in FIG. 6, which represent data packets, indicate different communications; for example, the application programs operating in the external nodes are different between the communications.

Referring to FIG. 6, an external node 310 first transmits a data packet to an external node 320. This packet arrives at the node 210 to which the external node 310 is connected (step S101).

After that, the processing to the step, in which the control device (controller) 100 sets a packet handling operation (flow entry) in the nodes 210-230, is the same as that in the first processing and therefore the description (steps S102 to S103) is omitted here. In the description below, too, assume that the contents of an instruction on a statistical information recording division that is issued to the node 230 are that, if a data packet having a different destination port number and/or source port number is transmitted or received, the statistical information is to be recorded distinctively assuming that the transmission or reception is a different communication.

After the packet handling operation (flow entry) has been set in the nodes 210-230, the node 210 forwards the buffered packet according to the packet handling operation (flow entry) that is newly set. Because the packet handling operation (flow entry) has already been set in the nodes 220 and 230 on the forwarding path of this packet, the packet is forwarded to the node 220 and then to node 230 and arrives at the external node 320 (steps S104-1 to S104-3). When the packet is forwarded, the node 210 and the node 220 update the flow statistical information (Counters) of the packet handling operation (flow entry). On the other hand, the node 230, to which the instruction on the statistical information recording division was issued, records the statistical information according to the instructed recording division and notifies the control device (controller) 100 that the recording of the statistical information has been started (step S104-5).

This statistical information recording start notification is assumed to include such information as the destination/source MAC address, destination/source IP address, and destination/source port number of the packet at which the recording of the statistical information is started. The control device (controller) 100 is able to determine the start or end of the statistical information collection based on the information included in the statistical information recording start notification.

After that, each time a data packet is forwarded between the external nodes 310 and 320, the nodes 210-230 update the flow statistical information or the statistical information (step S105-1 to S105-4).

Upon receiving the statistical information recording start notification, the control device (controller) 100 transmits a statistical information collection message, which specifies the packet handling operation (flow entry), to the node 230 and receives the statistical information, recorded according to the corresponding packet handling operation (flow entry) and the instructed recording division, from the corresponding node 230 (step S106). At this point of time, the statistical information on one type of communication (for example, destination port number=A) is transmitted to the control device (controller) 100.

Next, the external node 310 transmits a data packet of another communication to the external node 320 (step S107-1). Because this communication is different from the previous communication in which the packet handling operation (flow entry) described above was set, it is assumed that this data packet has the same destination/source MAC address and the same destination/source IP address as those of a data packet of the previous communication but has a destination port number and/or source port number different from that of a data packet of the previous communication.

As in the first exemplary embodiment described above, the packet handling operation (flow entry) that matches this data packet is already registered in the flow table 212 of the nodes 210-230 and, therefore, the nodes 210-230 forward the packet to the next hop according to the respective packet handling operation (flow entry) (step S107-2 to S107-4). In this case, too, the node 210 and node 220 update the flow statistical information (Counters) of the processing rule packet handling operation (flow entry) when forwarding the packet, whereas the node 230, to which the instruction on the statistical information recording division was issued, identifies the instructed recording division, that is, a different communication (for example, destination port number=B), and records the statistical information accordingly. In addition, the node 230 notifies the control device (controller) 100 that the recording of the different statistical information has been started (step S107-5).

After that, each time data packets of two communications are forwarded between the external nodes 310 and 320, the nodes 210-230 update the flow statistical information or the statistical information respectively (step S108-1 to S109-4).

Upon receiving the statistical information recording start notification, the control device (controller) 100 transmits a statistical information collection message, which specifies the packet handling operation (flow entry), to the node 230 and receives the statistical information, recorded according to the corresponding packet handling operation (flow entry) and the instructed recording division, from the corresponding node 230 (step S110). At this point of time, the statistical information on the two types of communication described above (for example, destination port number=A, destination port number=B) are transmitted respectively to the control device (controller) 100.

After that, upon detecting the end of the communication started in step S101, the node 230 transmits the statistical information recording end notification to the control device (controller) 100 (step S111). This statistical information recording end notification includes the destination/source MAC address, destination/source IP address, and destination/source port number of the packets of the communication that is ended. The control device (controller) 100 is able to determine the start or end of statistical information collection based on the information included in the statistical information recording end notification.

There are many ways for the node 230 to detect the end of communication. For example, when the recording of statistical information is started, the timer is started for the statistical information in the same manner the timer value in the action field of the packet handling operation (flow entry) is used and, if a packet belonging to one type of communication is not received for a predetermined period of time, the node 230 judges that the communication has ended.

After that, when the communication started in step S107 is also ended after steps S112-1 to S112-4, the timer value of the packet handling operation (flow entry) reaches 0. When the corresponding packet handling operation (flow entry) is deleted, the node 230 transmits the statistical information recording end notification for the communication started in step S107 and the packet handling operation (flow entry) deletion notification to the control device (controller) 100 (steps S114 and S115).

In addition to the effect of the first exemplary embodiment, the statistical information collection time of the control device (controller) 100 may be optimized (the statistical information collection operation may be controlled) in this exemplary embodiment as described above. Although both the start and the end of statistical information recording are notified to the control device (controller) 100 in the exemplary embodiment described above, one of them may also be notified.

While the preferred exemplary embodiments of the present invention have been described, it is to be understood that the present invention is not limited to the exemplary embodiments above and that further modifications, replacements, and adjustments may be added without departing from the basic technical concept of the present invention. The control device (controller) 100 in the exemplary embodiments above may be implemented as a dedicated server, and the nodes 210-230 may be implemented by the OpenFlow switch described above as well as by a router in an IP network or an MPLS (Multi-Protocol Label Switching) switch on an MPLS network. The present invention may be applied also to a network where a server integrally manages the nodes in the network.

As the statistical information collection messages forwarded between the control device (controller) 100 and the nodes 210-230 in the exemplary embodiments above, the Stats-Req message and the Stats-Rsp message described in Non-Patent Literature 2 may be used. As the statistical information recording start notification and the statistical information recording end notification, notified from a node to the control device (controller) 100 in the second exemplary embodiment above, vendor-defined messages described in Non-Patent Literature 2 may be used.

Although the control device (controller) 100 issues an instruction on a statistical information recording division and collects statistical information in the exemplary embodiments above, a configuration is also possible in which a device other than the control device (controller) 100 issues an instruction on a statistical information recording division and collects statistical information.

Although an instruction on a recording division is issued by additionally specifying a wildcard-included part of the matching rule (matching key) of the packet handling operation (flow entry) in the exemplary embodiment above, the instruction on a statistical information recording division may also be issued in some other method. For example, it is also possible to specify an arbitrary field in a higher layer as the recording division.

INDUSTRIAL APPLICABILITY

The present invention is applicable to a carrier network system. The present invention is applicable also to a system where charges are billed according to the communication status.

Finally, the following summarizes the preferred exemplary embodiments of the present invention.

First Mode

See the communication system in a first aspect above.

Second Mode

The communication system according to the first mode wherein the statistical information recording unit can record statistical information according to a division more subdivided than the matching rule.

Third Mode

The communication system according to the second mode wherein the statistical information recording division can be indicated by specifying a header field when the packet handling operation is set, the header field being a field in the matching rule not used for matching.

Fourth Mode

The communication system according to one of the first to third modes wherein the node can end recording of the statistical information if a packet, for which the statistical information is to be recorded, is not received for a predetermined time.

Fifth Mode

The communication system according to one of the first to fourth modes wherein the node can notify the statistical information collection device that the recording of the statistical information is started or ended and, based on the notification, the statistical information collection device controls a collection operation of the statistical information.

Sixth Mode

The communication system according to one of the first to fifth modes wherein the statistical information collection device can operates also as a control device that sets the packet handling operation in the node.

Seventh Mode

The communication system according to one of the first to sixth modes wherein information in a header or a data area of a higher-level layer may be specified as the statistical information recording division.

Eighth Mode

See the node in a second aspect above.

Ninth Mode

The node according to the eighth mode wherein the statistical information recording unit can records statistical information according to a division more subdivided than the matching rule.

Tenth Mode

The node according to the ninth mode wherein the statistical information recording division can be indicated by specifying a header field when the packet handling operation is set, the header field being a field in the matching rule not used for matching.

Eleventh Mode

The node according to one of the eighth to tenth modes wherein the node can ends recording of the statistical information if a packet, for which the statistical information is to be recorded, is not received for a predetermined time.

Twelfth Mode

The node according to one of the eighth to eleventh modes wherein said node can notify the statistical information collection device, which collects the statistical information, that the recording of the statistical information is started or ended.

Thirteenth Mode

The node according to one of the eighth to twelfth modes wherein information in a header or a data area of a higher-level layer may be specified as the statistical information recording division.

Fourteenth Mode

See the statistical information collection device in a third aspect above.

Fifteenth Mode

The statistical information collection device according to the fourteenth mode wherein the statistical information collection device can operates also as a control device that sets the processing rule packet handling operation in the node.

Sixteenth Mode

See the statistical information collection method in a fourth aspect above.

Seventeenth Mode

See the program in a fifth aspect above.

REFERENCE SIGNS LIST

100 Control device (controller)
100A Statistical information collection device
101 Flow entry database (flow entry DB)
102 Statistical information management unit
103 Topology management unit
104 Path/action calculation unit
105 Flow entry management unit
106 Control message processing unit
107 Node communication unit
210-230 Nodes
211 Control message transmission/reception unit
212 Flow table
213 Packet processing unit
214 Statistical information recording unit
310-320 External node

What is claimed is:

1. A communication system comprising:
    a node comprising:
    a packet processing unit that processes a received packet according to a packet handling operation, the packet handling operation defining a matching rule and processing of a packet that matches the matching rule; and
    a statistical information recording unit that records first statistical information on a packet according to a first division, which is similar with the matching rule; and
    a statistical information collection device that issues an instruction on a second division, different from the matching rule to said node and collects second statistical information according to the second division,
    wherein said statistical information collection device issues an instruction to the statistical information recording unit of said node separately from the packet handling operation,
    said statistical information recording unit records the second statistical information according to said instruction, and
    said statistical information recording unit sends, to a statistical information collection device, end notification indicating said recording of said first and second statistical information ends if said received packet is not received for a predetermined time.

2. The communication system as defined by claim 1, wherein said statistical information recording unit records the second statistical information according to the second division more subdivided than the matching rule.

3. The communication system as defined by claim 2, wherein the second division is indicated by specifying a header field when the packet handling operation is set, the header field being a field in the matching rule not used for matching.

4. The communication system as defined by claim 1, wherein said node ends recording of the second statistical information if a packet, for which the statistical information is to be recorded, is not received for a predetermined time.

5. The communication system as defined by claim 1, wherein said node notifies said statistical information collection device that the recording of the second statistical information is started or ended and, based on the notification, said statistical information collection device controls a collection operation of the second statistical information.

6. The communication system as defined by claim 1, wherein information in a header or a data area of a higher-level layer may be specified as the second division.

7. A node comprising:
    a packet processing unit that processes a received packet according to a packet handling operation, the packet handling operation defining a matching rule and processing of a packet that matches the matching rule;
    a statistical information recording unit that records first statistical information on a packet according to a first division, which is similar with the matching rule;
    a statistical information collection device that issues an instruction on a second division, different from the matching rule to said node and collects second statistical information according to the second division,
    wherein said statistical information collection device issues an instruction to the statistical information recording unit of said node separately from the packet handling operation,
    said statistical information recording unit records the second statistical information according to said instruction, and
    said statistical information recording unit sends, to a statistical information collection device, end notification indicating said recording of said first and second statistical information ends if said received packet is not received for a predetermined time.

8. A statistical information collection device that issues an instruction on the second division, different from the matching rule, to the node as defined by claim 7, as a statistical information recording division and collects the second statistical information according to the second division.

9. A statistical information collection method comprising:
    issuing, by a statistical information collection device, an instruction on a second division, different from a matching rule, to a node as a statistical information recording division, said statistical information collection device connected to said node comprising a packet processing unit that processes a received packet according to a packet handling operation, the handling operation defining the matching rule and processing of a packet that matches the matching rule;

recording, by said node, a first statistical information on a packet according to a first division, which is similar with the matching rule; and collecting, by said statistical information collection device, the second statistical information according to the second division, wherein said statistical information collection device issues an instruction to the statistical information recording unit of said node separately from the packet handling operation, said node records the second statistical information according to said instruction, and said statistical information recording unit sends, to a statistical information collection device, end notification indicating said recording of said first and second statistical information ends if said received packet is not received for a predetermined time.

10. A program stored in a non-transitory computer readable medium that causes a computer to perform processing, said computer configuring a node comprising:

processing, by a packet processing unit, a received packet according to a packet handling operation, the packet handling operation defining a matching rule and processing of a packet that matches the matching rule;

processing of recording first statistical information on a packet according to a first division, which is similar with the matching rule, according to an instruction from a predetermined statistical information collection device; and issuing, by a statistical information collection device, an instruction on a second division, according to which the second statistical information is to be recorded, to said node and collects the second statistical information according to the second division, wherein said statistical information collection device issues an instruction to said node separately from the packet handling operation, said node records the second statistical information according to said instruction, and said statistical information recording unit sends, to a statistical information collection device, end notification indicating said recording of said first and second statistical information ends if said received packet is not received for a predetermined time.

11. The communication system as defined by claim 2, wherein said node ends recording of the second statistical information if a packet, for which the statistical information is to be recorded, is not received for a predetermined time.

12. The communication system as defined by claim 3, wherein said node ends recording of the second statistical information if a packet, for which the statistical information is to be recorded, is not received for a predetermined time.

13. The communication system as defined by claim 2, wherein said node notifies said statistical information collection device that the recording of the second statistical information is started or ended and, based on the notification, said statistical information collection device controls a collection operation of the second statistical information.

14. The communication system as defined by claim 3, wherein said node notifies said statistical information collection device that the recording of the second statistical information is started or ended and, based on the notification, said statistical information collection device controls a collection operation of the second statistical information.

15. The communication system as defined by claim 4, wherein said node notifies said statistical information collection device that the recording of the second statistical information is started or ended and, based on the notification, said statistical information collection device controls a collection operation of the second statistical information.

16. The communication system as defined by claim 2, wherein information in a header or a data area of a higher-level layer may be specified as the second division.

17. The communication system as defined by claim 3, wherein information in a header or a data area of a higher-level layer may be specified as the second division.

18. The communication system as defined by claim 4, wherein information in a header or a data area of a higher-level layer may be specified as the second division.

19. The communication system as defined by claim 5, wherein information in a header or a data area of a higher-level layer may be specified as the second division.

20. The communication system as defined by claim 1, wherein said statistical information collection device issues an instruction to the statistical information recording unit of said node independently from the packet handling operation.

21. The communication system as defined by claim 1, wherein the statistical information collection device determines an end of collection of the first and second statistical information.

* * * * *